US011281685B1

(12) United States Patent
Wright

(10) Patent No.: US 11,281,685 B1
(45) Date of Patent: Mar. 22, 2022

(54) MODULAR COMMUNICATION MIDDLEWARE FOR DATA RETRIEVAL AND PRESENTATION

(71) Applicant: Pet Hospital Solutions LLC, Collierville, TN (US)

(72) Inventor: David H. Wright, Collierville, TN (US)

(73) Assignee: Pet Hospital Solutions, LLC, Collierville, TN (US)

( * ) Notice: Subject to any disclaimer, the term of this patent is extended or adjusted under 35 U.S.C. 154(b) by 117 days.

(21) Appl. No.: 16/351,157

(22) Filed: Mar. 12, 2019

(51) Int. Cl.
*G06F 16/25* (2019.01)
*G06F 16/9035* (2019.01)
*G06F 16/9038* (2019.01)

(52) U.S. Cl.
CPC ........ *G06F 16/252* (2019.01); *G06F 16/9035* (2019.01); *G06F 16/9038* (2019.01)

(58) Field of Classification Search
CPC . G06F 16/252; G06F 16/9038; G06F 16/9035
USPC ........................................................ 707/722
See application file for complete search history.

(56) References Cited

U.S. PATENT DOCUMENTS

| 6,137,870 | A | 10/2000 | Scherer | |
|---|---|---|---|---|
| 6,614,895 | B1 | 9/2003 | Impey et al. | |
| 7,023,979 | B1* | 4/2006 | Wu | H04M 3/5233 379/265.11 |
| 7,120,139 | B1* | 10/2006 | Kung | H04L 12/2801 370/352 |
| 7,724,890 | B1 | 5/2010 | Conrad et al. | |
| 8,068,603 | B2 | 11/2011 | Conrad et al. | |
| 2002/0073207 | A1* | 6/2002 | Widger | H04M 3/436 709/227 |
| 2003/0187971 | A1 | 10/2003 | Uliano et al. | |

(Continued)

FOREIGN PATENT DOCUMENTS

WO        98/43150 A2    10/1998

OTHER PUBLICATIONS

Zendesk, Advanced Caller App Integration with Zendesk Support, available at www.zendesk.com/apps/support/advanced-caller/, last accessed Dec. 20, 2017, 2 pages.

(Continued)

*Primary Examiner* — James Trujillo
*Assistant Examiner* — Fariborz Khoshnoodi
(74) *Attorney, Agent, or Firm* — Patterson Intellectual Property Law, P.C.

(57) ABSTRACT

Apparatuses, systems, and methods are provided for a modular communication middleware for data retrieval and presentation. An agent device includes a customer service application and a customer service database. An external telephony system and an application system are provided. The application system includes a data storage and a query component coupleable to the external telephony system. The query component may receive an incoming call from the external telephony system and query the data storage for additional information based at least in part upon the received incoming call. A user interface component may selectively transmit match information to the customer service application for presentation to a user of the customer service application based at least in part upon a result of the query to the data storage.

20 Claims, 10 Drawing Sheets

(56) References Cited

U.S. PATENT DOCUMENTS

| | | | |
|---|---|---|---|
| 2006/0188085 A1* | 8/2006 | Ricketts | G06Q 10/0639 |
| | | | 379/265.06 |
| 2012/0011428 A1* | 1/2012 | Chisholm | G06F 16/313 |
| | | | 715/230 |
| 2013/0268490 A1* | 10/2013 | Keebler | G06F 16/9535 |
| | | | 707/627 |
| 2014/0032597 A1 | 1/2014 | Ellis et al. | |
| 2016/0148177 A1* | 5/2016 | Best | G06Q 20/363 |
| | | | 705/65 |

OTHER PUBLICATIONS

Call-Center-Tech, Screen Pop Computer Telephony Integration Solutions, available at www.call-center-tech.com/screen-pop.htm, last accessed Jan. 8, 2018, 2 pages.

Richard Feinberg et al., Cases in Call Center Management Great Ideas (Th)at Work, Purdue University Press, Dec. 6, 2004, pp. 31-32.

Tenfold, Eight Benefits to Using Call Center CTI, available at www.tenfold.com/what-is/eight-benefits-to-using-call-center-cti/, last accessed Dec. 20, 2017, 11 pages.

Insight Software Solutions, Inc., Macro Express Pro Manual of Instruction, Undated, Document creation date Feb. 25, 2015, 532 pages.

Nextcaller, Know Your Caller Advanced Caller ID, available at www.nextcaller.com, last accessed Dec. 20, 2017, 1 page.

Shauna Geraghty, Using Caller ID in the Call Center | Talkdesk, available at www.talkdesk.com/blog/using-caller-d-in-the-callcenter/, Nov. 26, 2014, last accessed Jan. 18, 2022, 9 pages.

\* cited by examiner

| Date & Time | Caller ID# | Caller Name | Chat Name | Phone # Updated By |
|---|---|---|---|---|
| 11/17/2017 09:10 AM | 355-624-1212 | DOE, JOHN | | |
| 11/17/2017 09:10 AM | 355-555-5566 | DOE, JANE | Jane Doe | BACK OFFICE |
| 11/17/2017 09:10 AM | 355-555-5566 | DOE, JANE | Jane Doe | RECEPTIONIST 1 |
| 11/17/2017 09:10 AM | 355-555-5566 | DOE, JOE | | FRONT DESK |
| 11/17/2017 09:10 AM | 355-555-5566 | DOE, JOHN | John Doe | FRONT DESK |
| 11/17/2017 09:10 AM | 355-555-5566 | DOE, JANE | Jane Doe | RECEPTIONIST 2 |
| 11/17/2017 09:10 AM | 355-555-5566 | DOE, JANE | | |
| 11/17/2017 09:10 AM | 355-555-5566 | DOE, JOHN | John Doe | OFFICE 2 |
| 11/17/2017 09:10 AM | 355-555-5566 | DOE, JANE | Jane Doe | OFFICE 1 |
| 11/17/2017 09:10 AM | 355-555-5566 | DOE, JOHN | John Doe | FRONT DESK |
| 11/17/2017 09:10 AM | 355-555-5566 | DOE, JANE | Jane Doe | FRONT DESK |
| 11/17/2017 09:10 AM | 355-555-5566 | DOE, JOHN | | |

Fetch It History — 340

Copy Caller ID
Why is this red? — 342

*FIG. 3D*

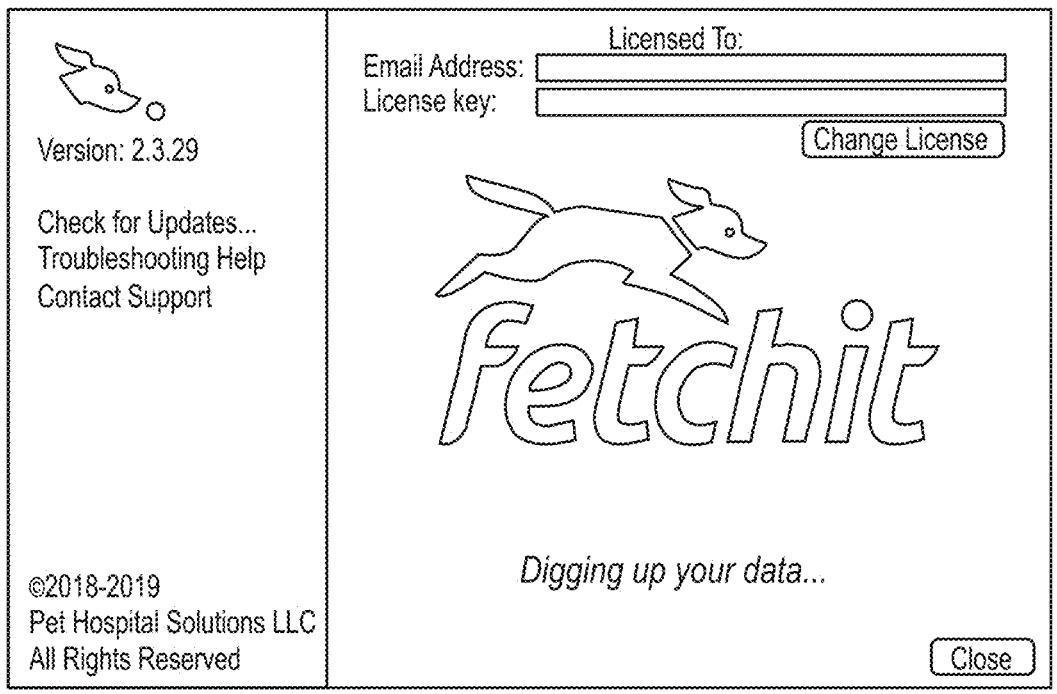

*FIG. 3E*

CONFIGURATION COMPONENT

Fetch It Application Settings

| Application Setup | Fetchit DB Connection | CRM Setup |

Phone System Interface
- Phone System Type: Fetchit Interface
- TCP Port: 1030
- Fetchit Interface UDP Port: 3520

Pop-up Notification
- Position: Lower Right
- Duration if Chart found (in Seconds): 30
- Duration if Chart not found (in Seconds): 60

Caller ID Filtering
- Filter Mask: xxx

Call History records to display: 1000

☑ Start with Windows automatically   ☐ Do not popup calls (to use history only)
☐ Enable Debug Log

[Test Broadcast]  [Open Firewall]
[Save]  [Close]

CONFIGURATION COMPONENT

410

MODULAR COMMUNICATION MIDDLEWARE FOR DATA RETRIEVAL AND PRESENTATION

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

None.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to apparatuses, systems, and methods for providing a modular communication middleware for data retrieval and presentation. Customer service agents in a variety of businesses rely on the ability to have customer account information readily available in a computer system upon receiving an incoming phone call. Manually performing searches based upon a customer name, account number or other information such as address is time consuming. Customers have to endure the time required to find their information resulting in frustration. Other customers that are on hold waiting to be serviced may not wait and will potentially take their business somewhere else. Fewer calls are able to be processed by the agent so the company has to employ more agents to handle the call volume. Some systems have existed to improve the search time but have required the purchase of a specific telephony system, as the search was a function of the telephony system itself. Some other systems have been able to improve the search time by connecting to off-the-shelf application software but were limited by these and cannot control the customer service software being used by the agent.

BRIEF SUMMARY OF THE INVENTION

Embodiments of the present disclosure provide apparatuses, systems, and methods for modular data communication middleware for data retrieval and presentation.

Implementations consistent with the present disclosure may modularly connect to a plurality of software and telephony systems. Various embodiments may uniquely improve customer service experience in many ways. An average of 37 seconds per call may be saved in one exemplary embodiment, which translates to happier customers, more calls handled per agent, and thus fewer agents required, which saves the company payroll expense. Upon the first ring of an agent's telephone, a single mouse click in the present disclosure presents the agent with the customers record in their customer service application software. The agent is then able to assist the customer, immediately resulting in better service and a happy customer.

Exemplary embodiments may improve the accuracy of records in the customer service application. This may be accomplished by capturing the phone number of an incoming call which is indicated to the agent as either a known number or unknown number (e.g., by color-coding). If unknown, the system is able to "copy" the number to the system clipboard, enabling efficient and accurate updating of the customer record. By easily and continually updating customer contact numbers via the system, users can greatly improve their ability to contact their customers. The system may also track which agents answer calls and update customer records to improve the ability of the business to measure agent work performance. Previous call history may be maintained and may be available to an agent or other service agents for quick recall in case a follow-up call is required.

Another unique capability consistent with present disclosure provides a reporting component which provides the business detailed analysis or call volume by day, week, month to improve the scheduling of agents thus providing better customer service and optimizing staffing expense.

Implementations consistent with the present disclosure provide a system for providing a modular communication middleware for data retrieval and presentation. The system may include an agent device, the agent device including a customer service application and a customer service database, the customer service database configured to store customer information. The system may further include an external telephony system and an application system. The application system includes a data storage, a query component coupleable to the external telephony system, the query component configured to receive an incoming call from the external telephony system and to query the data storage for additional information based at least in part upon the received incoming call, and a user interface component configured to selectively transmit match information to the customer service application for presentation to a user of the customer service application based at least in part upon a result of the query to the data storage.

A further implementation consistent with the present disclosure provides a method for providing data retrieval and presentation. The method includes receiving an incoming call from an external telephony system at an application system, querying a data storage of the application system responsive to the received incoming call, determining a match information responsive to the query to the data storage, conveying the match information from the application system to a customer service application, and providing a visual indicia to the user of the customer service application corresponding to the match information.

Yet another implementation consistent with the present disclosure provides an application system coupleable to an external telephony system and a customer service application. The application system includes a data storage, a query component coupleable to the external telephony system, the query component configured to receive an incoming call from the external telephony system and to query the data storage for additional information based at least in part upon the received incoming call, the incoming call including calling party identification (CPID) information, the query component configured to query the data storage based upon the CPID information, and a user interface component configured to selectively transmit match information to the customer service application based at least in part upon a result of the query to the data storage.

Numerous other objects, features, and advantages of the present invention will be readily apparent to those skilled in the art upon a reading of the following disclosure when taken in conjunction with the accompanying drawings.

BRIEF DESCRIPTION OF THE SEVERAL VIEWS OF THE DRAWINGS

FIG. 3D illustrates an exemplary embodiment of a history window according to aspects of the present disclosure.

FIG. 3E illustrates an exemplary embodiment of a login/splash screen according to aspects of the present disclosure.

FIG. 4A illustrates an exemplary embodiment of a configuration component according to aspects of the present disclosure.

DETAILED DESCRIPTION OF THE INVENTION

Figure 1:
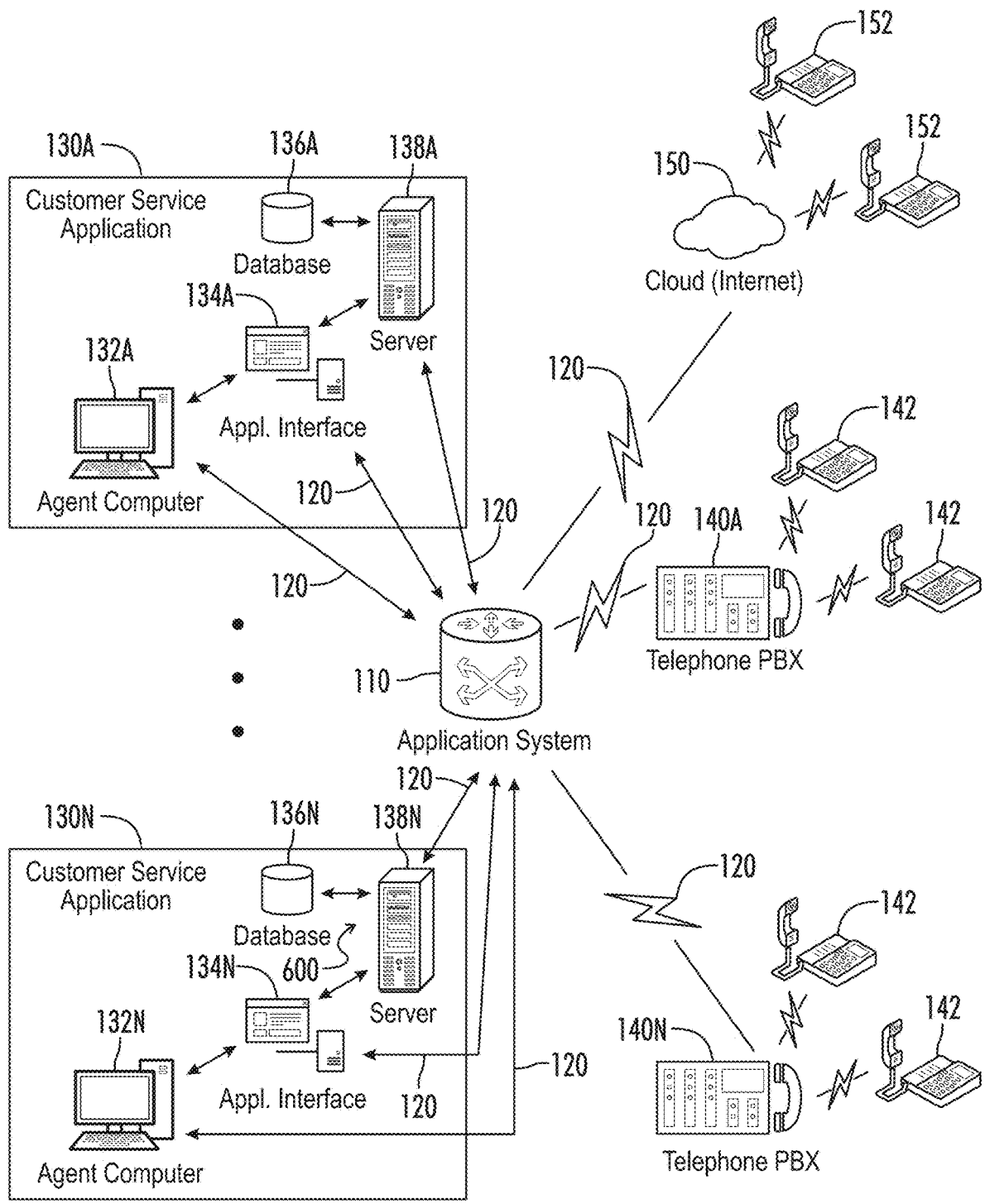
FIG. 1 illustrates an exemplary embodiment of a system for providing a modular communication middleware for data retrieval and presentation according to aspects of the present disclosure.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-7, various exemplary apparatuses, systems, and associated methods according to the present disclosure are described in detail. Where the various figures may describe embodiments sharing various common elements and features with other embodiments, similar elements and features are given the same reference numerals and redundant description thereof may be omitted below. One or more implementations of application systems and methods disclosed herein may include different types and generations of computers, servers, operating system software, and telephony communication devices. Implementations may include different vendors and their different hardware and software within the range of device and management of those devices. Systems consistent with the present disclosure may be integrated into an office technology environment including computers, servers, and telephony equipment.

Various embodiments of an apparatus according to the present invention may provide apparatuses, systems, and methods for modular data communication middleware for data retrieval and presentation.

FIG. 1 illustrates an exemplary embodiment of a system for providing a modular communication middleware for data retrieval and presentation according to aspects of the present disclosure. The system 100 includes at least one of an application system 110, communication link 120, customer service application 130, telecommunication system 140, network 150, device 142, and/or device 152. One or more of the application system 110, customer service application 130, telecommunication system 140, network 150, device 142, and/or device 152 may be communicatively coupled to one another in a one-to-one or one-to-many configuration via at least one communication link 120. In one exemplary embodiment, the communication link 120 includes one or more of the Internet, a public network, a private network, cloud-based environment, or any other communications medium capable of conveying electronic communications or combination thereof. Connection between one or more elements may be performed by wired interface, wireless interface, or a combination thereof, without departing from the spirit and the scope of the present disclosure.

The application system 110 may be coupled to a customer service application 130. The customer service application 130 may include a plurality of customer service applications 130A, . . . , 130N, one or more of which may be coupled to the application system 110 via at least one communication link 120. Additionally or alternatively, at least a portion of at least one customer service application 130 may be physically and/or virtually associated with or otherwise embodied within the application system 110. Furthermore, the application system 110 may include one or more computing elements, either alone or in combination, capable of performing at least one operation or function described herein. A customer service application 130 may include one or more of an agent computer 132, an application interface 134, a database 136, and/or a server 138. As noted above, the system 100 may include a plurality of customer service applications 130, thus there may at least one agent computer 132A, . . . , 132N, application interface 134A, . . . , 134N, database 136A, . . . , 136N, and/or server 138A, . . . , 138N, alone or in combination, associated with one or more respective customer service application(s) 130A, . . . , 130N.

The agent computer 132 (e.g., an agent device—either alone or in combination with application interface 134) and/or at least one component of the application system 110 may be at least one of a desktop computer, a laptop computer, a smart phone, or any other electronic device capable of executing instructions. The agent computer 132 may include a microprocessor such as, for example, a generic hardware processor, a special-purpose hardware processor, or a combination thereof. In embodiments having a generic hardware processor (e.g., as a central processing unit (CPU) available from manufacturers such as Intel and AMD), the generic hardware processor is configured to be converted to a special-purpose processor by means of being programmed to execute and/or by executing a particular algorithm in the manner discussed herein for providing a specific operation or result.

The agent computer 132 may include a display unit. The display unit may be configured to be either wired to or wirelessly-interfaced with the computing device 132. The display unit may be configured to operate, at least in part, based upon one or more operations of an application system 110 and/or application interface 134, as executed by the microprocessor described above. In one exemplary embodiment, the application interface 134 may include and/or be coupled to an internet browser configured to obtain at least one set of information and display at least a portion of a representation thereof to a user of the agent computer 132 via the display unit. Although operable using the display unit of an agency computer 132, the application interface 134 may be capable of executing and operating using a plurality of devices. For example, one or elements of one or more customer service application(s) 130 and/or application system 110 may include a desktop computer, smart phone, tablet, laptop computer, etc., or any combination thereof, optionally having different microprocessors, screen resolutions, memory sizes, etc., but each being capable of executing at least a portion of the application interface 134 and/or application system 110. Additionally or alternatively, at least a portion of the application interface 134 or information associated with the application interface 134 may be previously installed on an agent computer 132, such as via manufacturer factory installation settings and/or as a part of an operating system of the agent computer 132. The application interface(s) 134 may be communicatively coupled to agent computer(s) 132. In various embodiments, the application interface 134 is configured to execute upon the agent computer 132, for example using a browser or standalone application installed upon or otherwise accessible to the agent computer 132.

A server 138 may be associated with a customer service application 130. The server 138 may be configured as a part of the customer service application 130, either in whole or in part, and/or may be implemented remotely from the customer service 130, in whole or in part, in various embodiments. The server 138 may be communicatively coupled to at least one database 136. The database 136 may be configured to store at least a portion of information used by or otherwise in relation to the customer service application 130 and/or application system 110. For example, the database 136 may include at least a portion of customer information, association information, pet information, telephone number information, e-mail address information, contact information, or any other form of information or association thereof consistent with the present disclosure. In one exemplary embodiment, the database 136 is configured to store at least a portion of information used in association with the information system 110, such as application data, customer information, localized historical information, global historical information, or any other information and/or associations.

In one exemplary embodiment, the system 100 includes a plurality of users and/or agents, each using a customer service application 130 via an agent computer 132 thereof. The agent is able to receive a call from the application system 110 from an end-user (e.g., via traditional telephony and/or network-connected messaging or telephone service (s)) and view call information using the agent computer 132 and application interface 134 corresponding thereto. The system 100 may be configured to permit a plurality of simultaneous users/agents to receive calls independently or in association with one another.

The application system 110 may be configured to route one or more calls to an agent according to one or more predetermined and/or dynamically determined criteria. For example, the application system 110 may be configured to route a call to a particular agent based at least in part upon that particular agent having interacted with a particular end-user, an association between the agent and a subject matter, a locality of the agent relative to the end user, a rating of the agent, a rating of the end user, any combination thereof, or any other predetermined or dynamically determined criteria for assignment or distribution. The application system 110 may be configured to provide information to/from one or more customer service application(s) 130, for example to/from one or more devices 142/152 via one or more network 150 and/or telephony Private Branch Exchange (PBX) 140.

The system 100 may include an application system 110 communicatively coupled to one or more telephony PBX systems 140A, . . . , 140N. Each telephony PBX system 140 may be coupled to one or more devices 142, such as a telephone device, via one or more wired or wireless connections or a combination thereof. Additionally or alternatively, the application system 110 may be coupled to a network 150, such as the Internet, a public network, a private network, or any combination thereof. In one exemplary embodiment, the network 150 is a cloud computing network or other distributed network or distributed network component. One or more devices 152 may be communicatively coupled to the network 150 in various embodiments. The devices 152 may include one or more of a telephone, a smart phone, a cellular phone, an electronic device, or any other device or component capable of communicating via the network 150.

Figure 2:
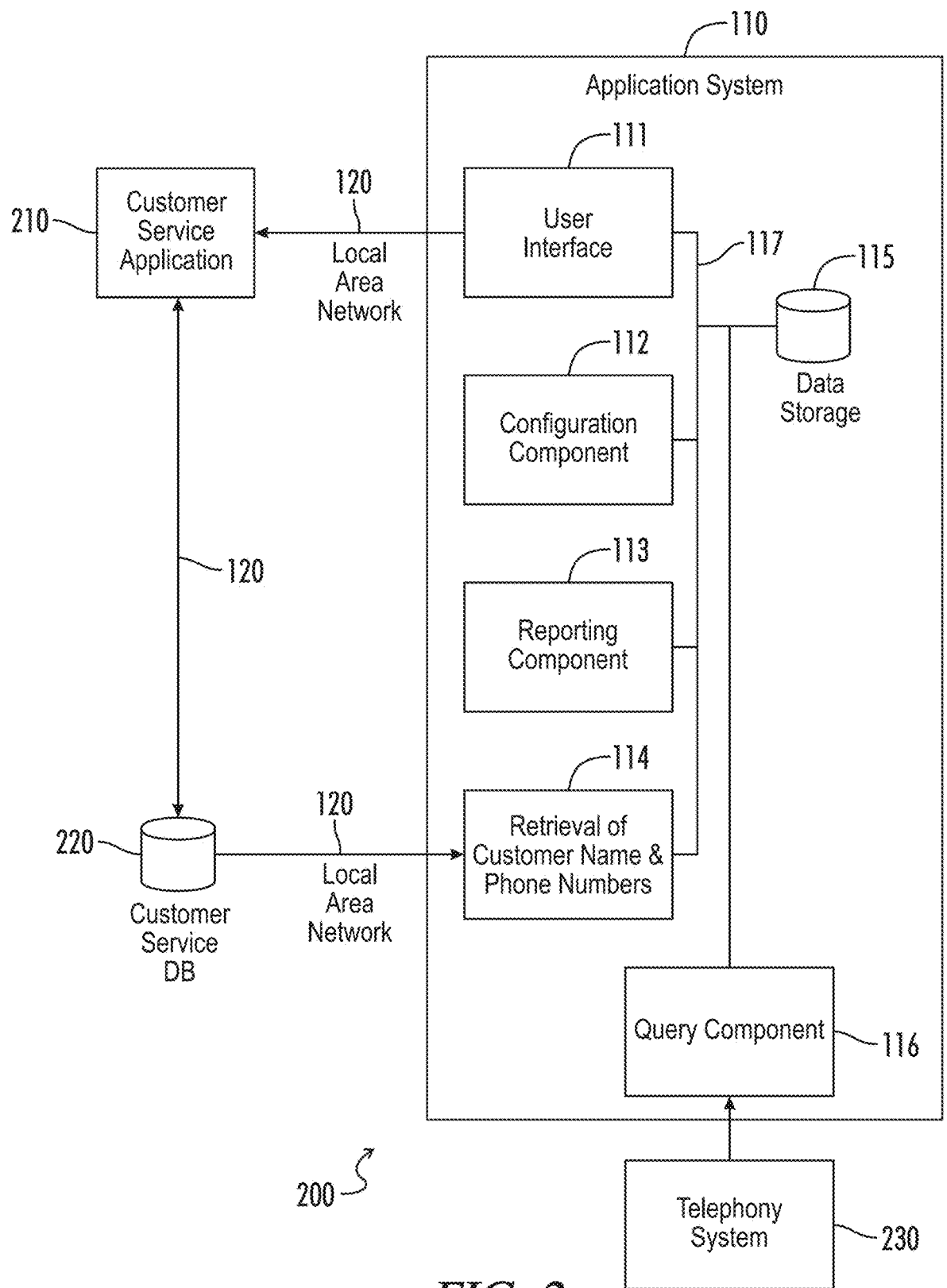
FIG. 2 illustrates an exemplary functional block diagram of a system according to aspects of the present disclosure.

FIG. 2 illustrates an exemplary functional block diagram of a system according to aspects of the present disclosure. The system 200 includes an application system 110. The application system 110 includes one or more of a user interface component 111, a configuration component 112, a reporting component 113, a retrieval component 114, a data storage 115, and/or a query component 116. One or more of the user interface component 111, a configuration component 112, a reporting component 113, a retrieval component 114, a data storage 115, and/or a query component 116 may be communicatively coupled to at least one other component via a bus 117. The bus 117 may be any wired or wireless communication medium configured to convey information. In various embodiments, the user interface component 111 is configured to transmit to and/or receive from the customer service 130 one or more sets of information used by at least one of the application system 110 and/or customer service application 130.

The application system 110 may be communicatively coupled to a customer application 210 via a communication link 120. In one exemplary embodiment, the customer service application 210 is equivalent to the customer service application 130 described above. The customer service application 210 may be executed upon or otherwise accessible by a computing device, such as an agent computer 132. The customer service application 210 may be communicatively coupled to a customer service database 220 via at least one communication link 120. In an exemplary embodiment, the customer service application 210 and the customer service database 220 are coupled to one another and/or to the application system 110 via one or more local area networks via the communication link(s) 120.

The application system 110 may be further coupled to at least one telephony system 230. In an exemplary embodiment, the application system 110 may be coupled to one or more telephony PBX systems 140A, . . . , 140N and/or to one or more networks 150 and may operate in the manner described above.

Figure 3A:
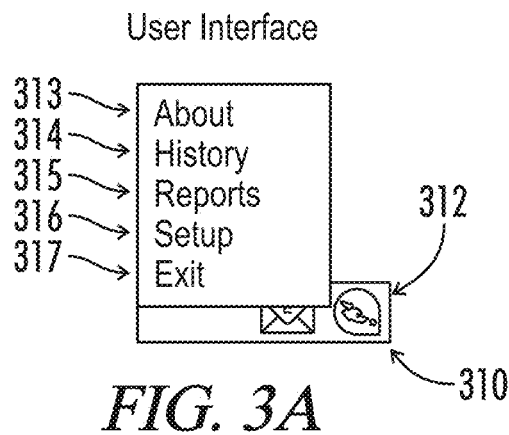
FIG. 3A illustrates an exemplary embodiment of a user interface of the customer service application according to aspects of the present disclosure.

FIG. 3A illustrates an exemplary embodiment of a user interface of the customer service application 130 according to aspects of the present disclosure. The operations menu 310 optionally includes an icon 312. The icon 312 may be configured to permit selection of at least one option (e.g., when clicked or otherwise selected). In the embodiment illustrated by FIG. 3A, the at least one option may be selected from one or more of the menu group about 313, history 314, reports 315, setup 316, and/or exit 317, although additional or fewer options may be provided without departing from the spirit and the scope of the present disclosure. The operations menu 310 may be configured as the starting point for user/agent interaction and may allow a user/agent to initiate or perform specific functions. Examples of options are provided below.

About

The About menu option 313 may be configured to open an informational window displaying the current version, copyright dates and user licensing details when selected.

History

The History menu option 314 may be configured to open a history window (e.g., illustrated by and described herein with reference to FIG. 3D) containing prior incoming call records including, but not limited to, the date and time of a call, the calling party identification (CPID), calling party name (CPNAME), Chart Name, and/or a user name that updated the record(s). The history window may display the most recent records in reverse chronological order in various exemplary embodiments. The user/agent may be provided with the ability to double-click a record to trigger a calling party Query component. A user/agent may also be provided with the capability to select a desired set of records and to copy at least a portion of the set of records to the system clipboard of the customer service application 130 in order to paste them into another computer program, such as to enable spreadsheet analysis. A user/agent may right-click a record and a pop-up menu may be displayed. This menu may provide the user/agent with an option to copy the selected CPID to the system clipboard to allow the user/agent to update a customer's record in the customer service application 130, for example by pasting in this number error free. A user/agent may be provided with a second option to assist the user/agent in determining possible errors in the case of a red popup notification for what appears to be a known customer identifier such as a phone number or other customer, device, or location identifier. That is to say that a user/agent may be provided with an ability to resolve possible error(s) associated with one or more sets of information and/or parameters.

Reports

Figure 5A:
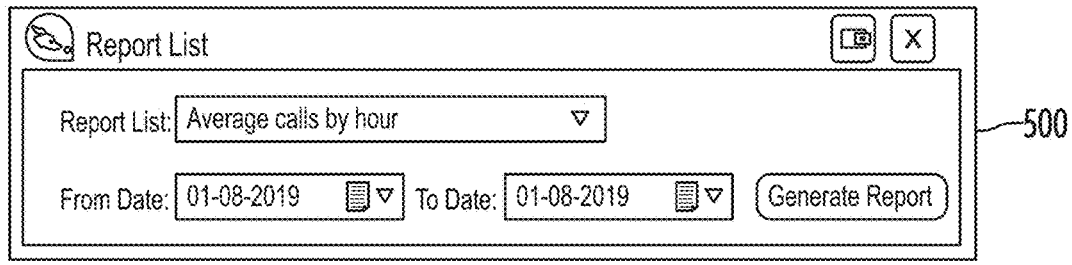
FIG. 5A illustrates an exemplary embodiment of a reporting criteria selection interface according to aspects of the present disclosure.
Figure 5B:
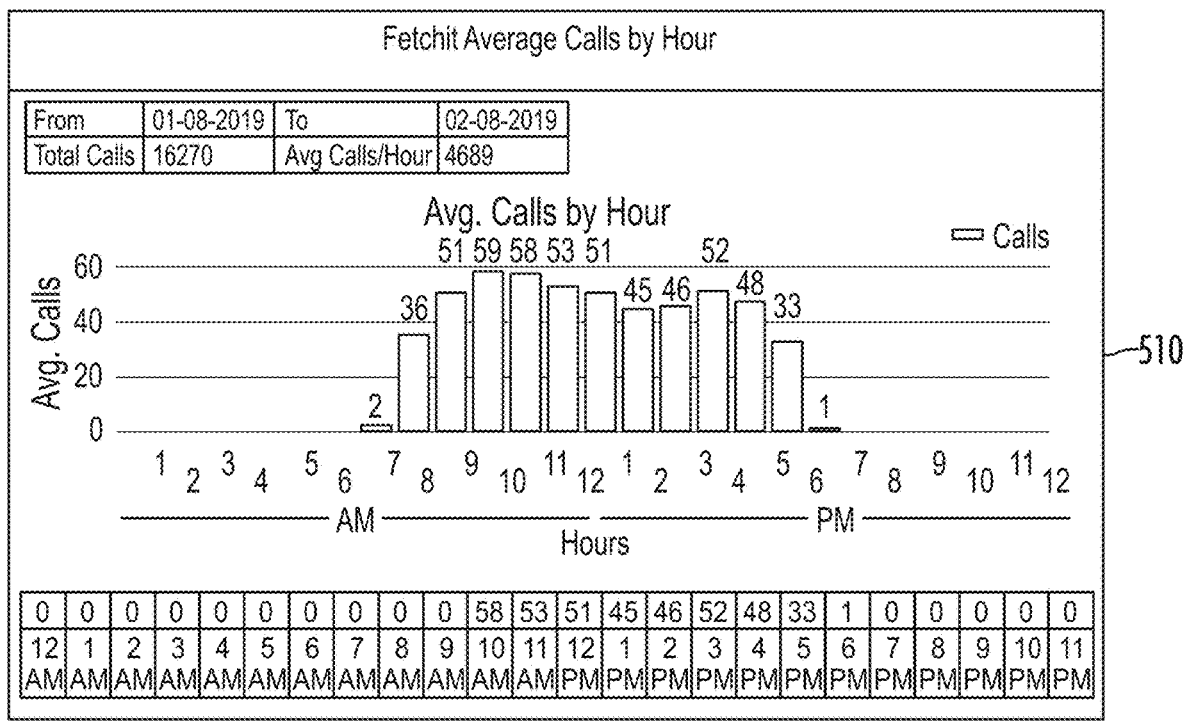
FIG. 5B illustrates an exemplary embodiment of a generated report according to aspects of the present disclosure.

The Reports menu option may include a reporting component 113. Upon selecting this option, a report list window may be opened enabling a user/agent to select one or more desired reports. A user/agent may be provided with a temporal range restriction, such as a date range restriction, and may be used to generate at least one report. An exemplary embodiment of a report and temporal restriction option is illustrated by and described with reference to FIGS. 5A and 5B. The exemplary embodiment illustrated by FIGS. 5A and 5B provides an averaged analysis of calls processed during a selected date range to indicate incoming call volume which may be used to dictate user/agent demand and/or to assist in employee scheduling thereby optimizing customer service efficacy.

Setup

The setup menu option 316 may be configured to utilize the Configuration component 112. The configuration component 112 may permit a user/agent to specify one or more operational setting(s) consistent herewith. Configurable options may include, for example, the following parameters:

(i) Phone System Type: Selection of the appropriate module which interfaces to the customer agent's telephony system.

(ii) Popup Notification options: Optionally provide user-selectable personalization settings for the location of the popup notification and duration timeout to remain visible before automatically closing.

(iii) Caller ID Filter Mask: Optionally provides for the filtering of a specific mask of numbers, characters or length of numbers in the calling party identifier (CPID). This mask may enhance the system's ability to ignore certain calls or types of calls to be ignored by the system. For example, inter-office calls may be filtered using the Caller ID Filter Mask.

(iv) Call History Records to Display: Provides the ability to optionally restrict the number of records to be displayed in a History window, such as the window illustrated by and described with reference to FIG. 3D.

(v) Start with Windows automatically: This option may assist a customer agent in automatically starting one or more systems or components described herein when an electronic device is started and may result in eliminating at least one step required to perform their functions or duties.

(vi) Do not pop-up calls: This option may permit the system or component thereof to be used for historical purposes, such as in the case of a user/agent that is not a customer service agent but needs access to call processing.

(vii) Test Broadcast: May be used to optionally initiate a pop-up message or window on all or a portion of member/user/agent devices across a network such as a local area network connection in order to verify functionality and proper network configuration.

(viii) Database Connection: This option permits display and allows for the selection of the location of an information database on a network such as a local area network.

(ix) CRM Setup: This option permits display and optionally allows for selecting a module which interfaces to the customer agent's customer service application 130, 210. These applications may be referred to by various acronyms, such as CRM (customer relationship management), PMS (patient management system), and/or PIM (patient information management) as examples of possible customer service applications, although systems consistent with the present disclosure may be operable with fewer or more than these particular customer service applications. The system may optionally include a tuning option at least in part depending upon a capability, speed, and/or other parameter associated with a user/agent electronic device which may be utilized to optimize a speed at which the system is capable of controlling the customer service application 130. The user/agent may manually alter this speed or use an Auto Tune function which may perform sample control functions of the customer service application at different speeds prompting the user/agent for the most efficient selection.

Exit

The Exit menu option may be configured to terminate processing by the system in various embodiments.

The Retrieval component 114 is an optional service apparatus configured to run in the background of a host system. This component may be scheduled to automatically execute every 60 minutes, or any other periodic or non-periodic time. In one or more exemplary embodiments, the Retrieval component 114 may include the task of utilizing the module which interfaces to the customer agent's customer service application 130, 210 to query the customer service database 220 for all customer identifiers, names, phone numbers, or any other information, and may be configured to save them to the a data storage 115 of the application system 110. In one exemplary embodiment, the data storage 115 is an SQL database, although any physical and/or virtual storage location or device may be used within the scope of the present disclosure. This process is illustrated in the exemplary embodiments of both FIG. 2 and FIG. 6. These records may be utilized by a calling party query component 116, for example upon receiving incoming calls.

The query component 116 is optionally configured to interface with one or more disparate telephony systems. For example, in various embodiments, the application system 100 is configured to use the calling party query component 116 to translate between a format or information parameter associated with a telephony system 230 and a query or data storage format of the data storage 115 and/or query or data format associated with at least one of the customer service application 210 and/or customer service database 220. For example, the application system 110 may be configured to translate between data formats and operations in relation to a particular CRM software at a customer service location (e.g., V-Tech CRM, Ezyvet CRM, Cornerstone CRM, Infinity/Impromed V5 CRM, AVImark CRM, or any other CRM system). That is to say that the application system 100 is configured to operate in accordance with any customer service system used according to logic used by the application system 110, such as by the calling party query component 116 or other component of the application system 110.

The application system 110 may be further configured to perform one or more data operations to communicate with a particular telephony or communications network. For example, the application system 110 may be configured to translate at least one set of information in accordance with a particular customer or caller telephony system. For example, the application system may be configured to modify at least one data packet for conformance with and/or transmission to or receipt from a telephony or communication system coupled to the application system 110 (e.g., via an application programming interface (API) associated with a telephony or communication system or other interface, data format, or parameter associated with one or more telephony or communication systems). Examples of telephony or communication systems useable by the application system include, for example, Broadview, RingCentral, Avaya, Alcatel/Lucent PIMphony, ESI Click To Calltrixbox Pro, or any other telephony or communication system capable of communication with the application system 110.

Figure 3B:
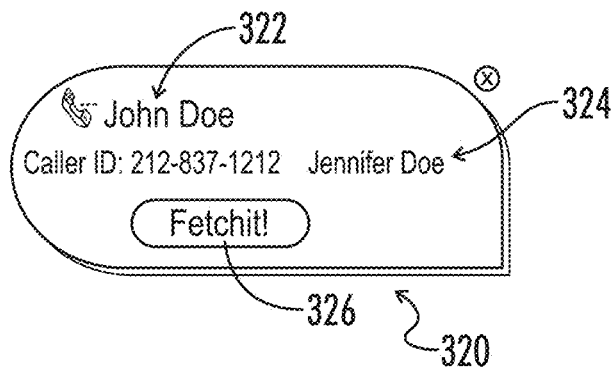
FIG. 3B illustrates an exemplary embodiment of a pop-up notification in accordance with aspects of the present disclosure.

FIG. 3B illustrates an exemplary embodiment of a pop-up notification in accordance with aspects of the present disclosure. The window 320 optionally includes one or more of a caller identifier 322, a data record 324, and a fetch operator 326. The window 320 may be selectively configured for display upon a match between the CPID and an identifier (such as phone number or other identifier) existing in an information database, for example the data storage 115. The system may be configured to display an indicia, such as blue coloring, to represent a match between the CPID and the identifier. The window 320 may include a set of information associated with a caller, such as an associated name as recorded by the system, optionally along with CPID information received from a telephony interface module (e.g., telephony PBX system 140, network 150, etc.). A user/agent may be presented with the fetch operator 326 which, when selected (e.g., pressed or clicked) optionally initiates control of the customer application system 130. The module designated for the customer service application 130 is optionally loaded and may then begin controlling the customer service application 130 to direct it to open a customer lookup selection, optionally initiates input of the matching account identifier, and executes a look-up. This functionally optionally provides an error-free capability to quickly retrieve a proper customer account record without questioning the customer for information such as name, phone number, etc. If the fetch operator 326 is selected (e.g., clicked) the system may automatically close the pop-up after a duration specified in the configuration component illustrated by and described with reference to FIG. 4A.

Figure 3C:
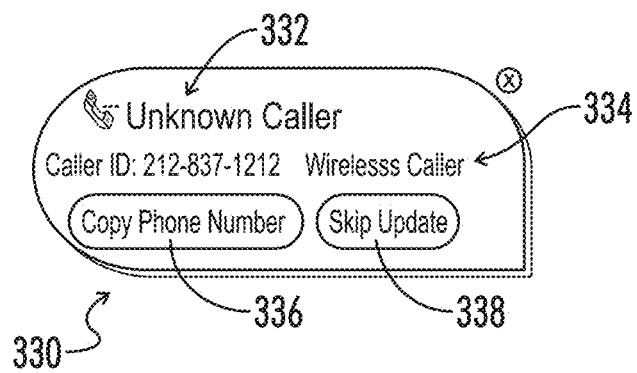
FIG. 3C illustrates an exemplary embodiment of a pop-up notification in accordance with aspects of the present disclosure.

If a match is not found, the system optionally displays a window 330 illustrated by and described with reference to FIG. 3C. The window 330 may be used to designate to the user/agent that no match exists in the data storage 115 of the application system 110, and thus this is an unknown caller, along with providing the CPID information received from the telephony interface module (e.g., telephony PBX system 140, network 150, etc.). A user/agent may be provided with one or more options, including a copy phone number button 336, a skip update button 338, or any combination thereof, including additional or fewer options. The copy phone number button 336 may be configured to "copy" at least a portion of a CPID to a system clipboard of a user/agent device to provide error-free capability to optionally "paste" this number into a customer's record, if desired, as a new or updated contact number (e.g., in the data storage 115). One or more module(s) associated with the customer service application 130 may be optionally loaded and the system may begin controlling the customer service application 130 to direct it to open a customer lookup selection then close. This may save a user/agent at least one step in operating a manual customer look-up by name, phone number, or any other set of information or part thereof. The skip update button 338 may be used to close the window 330. If neither the copy phone number button 336 nor the skip update button 338 is selected, the system may automatically close the window 330 after a duration specified in the configuration component 112 expires.

FIG. 3D illustrates an exemplary embodiment of a history window 340 according to aspects of the present disclosure. The history window 340 may be presented to a user/agent of the customer service application 130, 210. In one exemplary embodiment, at least a portion of the contents of the window 340 may provide information corresponding to previous callers, customer information, predetermined or dynamically determined identification information, or any other form or type of information consistent with the description herein. At least a portion of the window 340 is optionally selectable by a user, for example to provide options 342. The options 342 may provide a user/agent with the ability to copy information from the window 340 (such as caller ID information, and/or to obtain information regarding operation of the customer service application 130, 210 or caller information (e.g., by providing information about how or why a particular set of information is identified or coded a certain way).

FIG. 3E illustrates an exemplary embodiment of a login/splash screen 350 according to aspects of the present disclosure. The login/splash screen 350 may be used to provide a system access identifier, such as an e-mail address, and optionally a license key and/or authentication code associated with the system access identifier. The login/splash screen 350 may optionally further include user-selectable options for updating the customer service application 130, 210 and/or application system 110, for troubleshooting information, and/or for contacting an application support interface.

FIG. 4A illustrates an exemplary embodiment of a configuration component 400 according to aspects of the present disclosure. The configuration component 400 may be provided to an administrator and/or user or agent of the customer service application 130, 210 to view and/or modify at least one operational parameter associated with the customer service application 130, 210. For example, the configuration component 400 may include the ability to view and/or modify one or more of (i) phone system information including a phone switch type, a network port (e.g., TCP port) associated with a phone system, and/or a Fetchit network port (e.g., UDP port), (ii) pop-up notification information and settings optionally including a position of a pop-up window or notification, a pop-up or notification visual display duration period if a client match is found, and/or (iii) a pop-up or notification visual display duration period if a client match is not found. The configuration component 400 may further include the ability to view and/or edit caller ID filtering settings, including a filter mask, to specify a history time period, a selector to cause the customer service application 130, 210 to start automatically when an operating system is launched, a selector to only use historical call information, and/or a selector to enable a debug log. The configuration component 400 may further include options to save and/or close the configuration component 400.

Figure 4B:
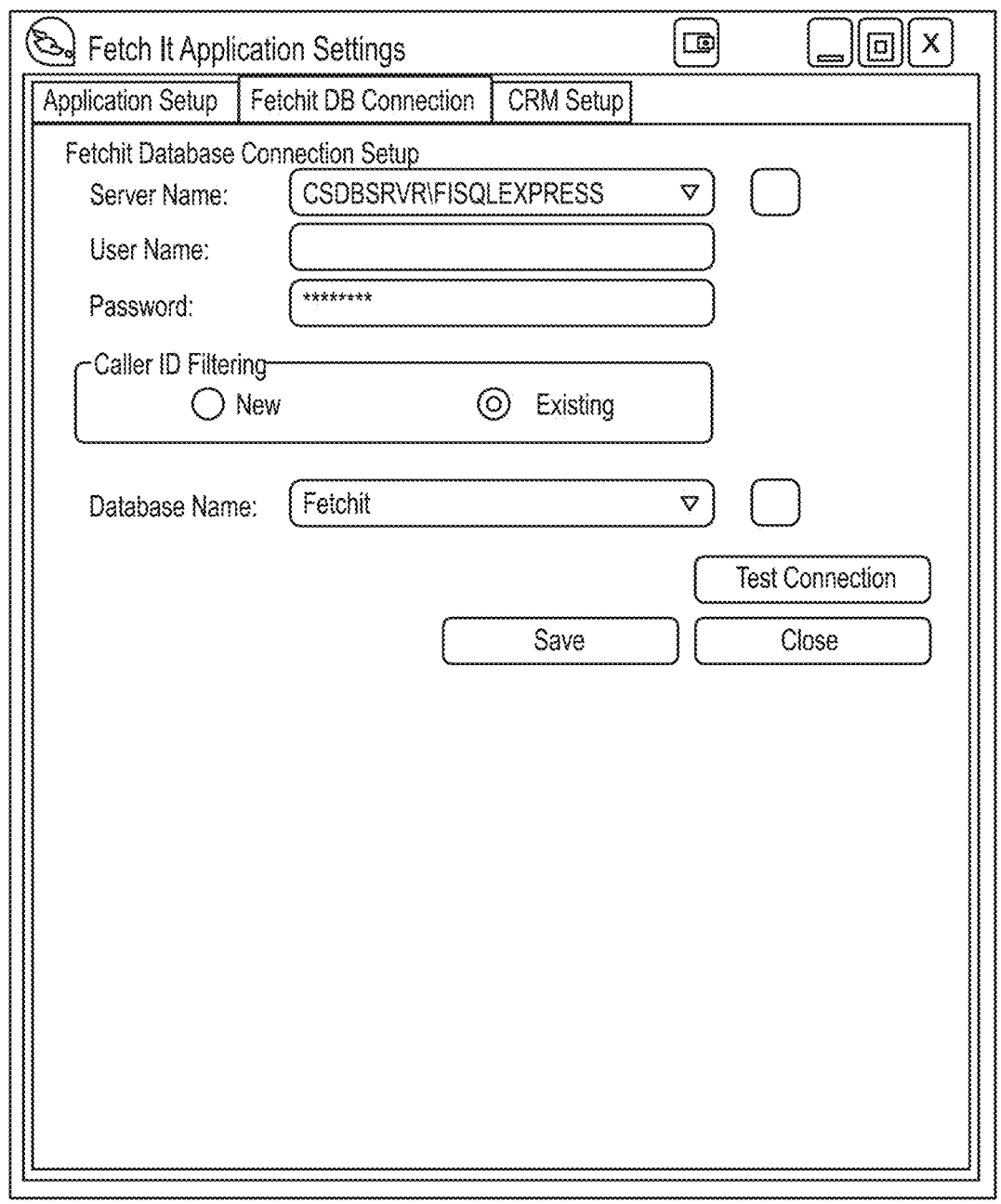
FIG. 4B illustrates an exemplary embodiment of additional aspects of a configuration component according to aspects of the present disclosure.

FIG. 4B illustrates an exemplary embodiment of additional aspects of a configuration component 410 according to aspects of the present disclosure. The configuration component 410 may be provided to an administrator and/or use or agent of the customer service application 130, 210 to view and/or modify at least one operational parameter associated with the customer service application 130, 210. For example, the configuration component 410 may include the ability to view and/or modify one or more of a Fetchit database configuration (e.g., for data storage 115 and/or database 136 or element(s) thereof), such as a server name, a user name, and/or a password. The configuration component 410 may further provide the ability to view and/or modify a setting as to whether the database is a new or existing database, to select or provide a database name, and/or to test a connection with an identified database. The configuration component 410 may further include options to save and/or close the configuration component 410.

Figure 4C:
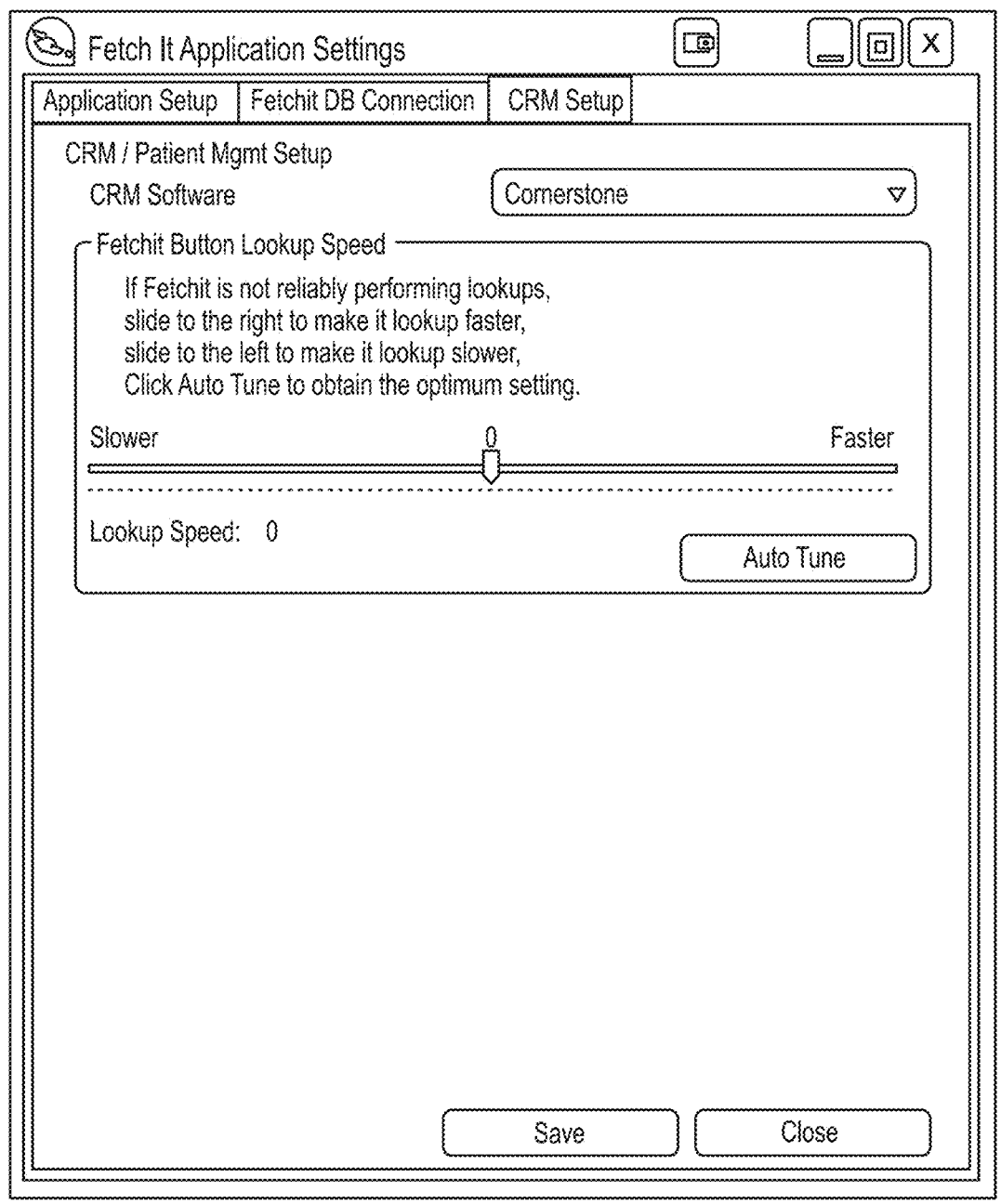
FIG. 4C illustrates and exemplary embodiment of a configuration component according to aspects of the present disclosure.

FIG. 4C illustrates and exemplary embodiment of a configuration component 420 according to aspects of the present disclosure. The configuration component 420 may be provided to an administrator and/or user or agent of the customer service application 130, 210 to view and/or modify at least one operational parameter associated with the customer service application 130, 210. For example, the configuration component 420 may include the ability to view and/or modify one or more of a CRM software selector, an option for a database look-up speed, and/or a selector for automatically tuning and/or selecting a database look-up speed (e.g., by performing a network speed and/or integrity check and selecting a corresponding recommended database look-up speed). The configuration component 420 may further include options to save and/or close the configuration component 420. Although described with reference to plural configuration components 400, 410, and 420, it should be appreciated that one or more of the settings of a configuration component 400, 410, 420 may be presented via a single interface or window or a plurality of interfaces or windows without departing from the spirit and scope of the present disclosure.

FIG. 5A illustrates an exemplary embodiment of a reporting criteria selection interface 500 according to aspects of the present disclosure. The reporting criteria selection interface 500 may provide the ability for an administrator or user/agent to select a report list and select a date range used to generate a report. Report information may optionally be visually displayed as a result of the report generation. FIG. 5B illustrates an exemplary embodiment of a generated report 510 according to aspects of the present disclosure. The generated report 510 may include text and/or graphical data conveyed to a user of the customer service application 130, 210 and/or application system 110. Information contained in one or more generated reports 510 may be used automatically and/or manually to fine tune an operational setting of the customer service application 130, 210 and/or application system 110, for example using one or more of the configuration components 400, 410, 420. The exemplary embodiment illustrated by FIGS. 5A and 5B provides an averaged analysis of calls processed during a selected date range to indicate incoming call volume which may be used to dictate user/agent demand and/or to assist in employee scheduling thereby optimizing customer service efficacy.

Figure 6:
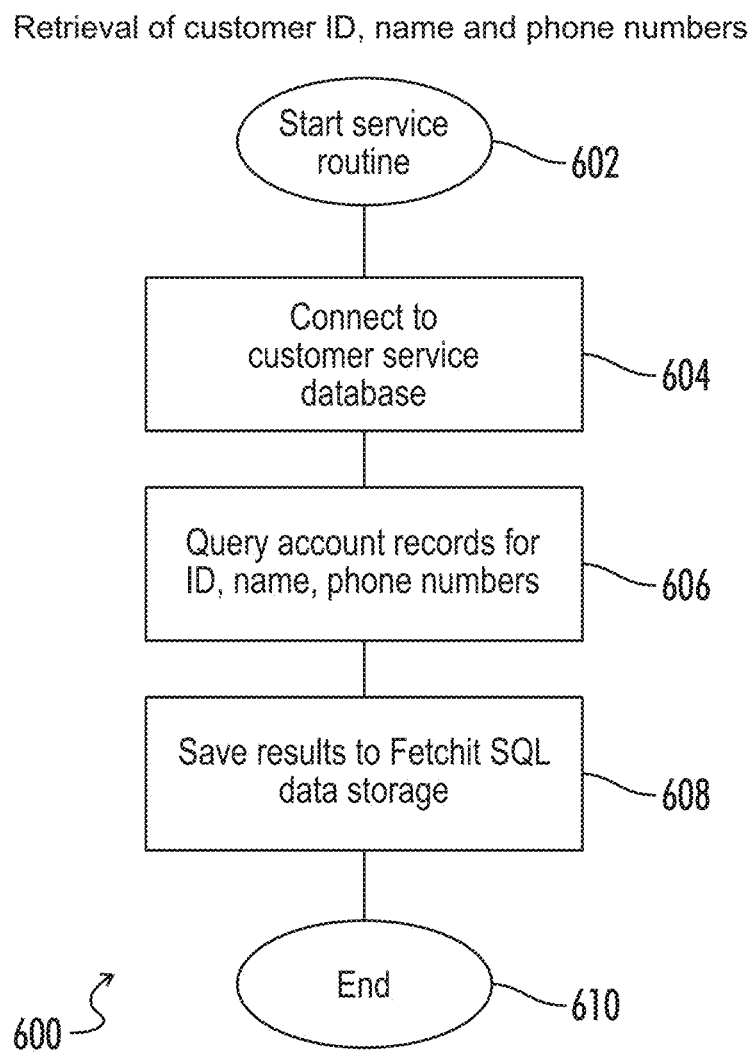
FIG. 6 illustrates an exemplary embodiment of a process for retrieving a customer identification, name, and phone number according to aspects of the present disclosure.

FIG. 6 illustrates an exemplary embodiment of a process for retrieving a customer identification, name, and phone number according to aspects of the present disclosure. The process 600 begins at a step 602 where a service routine is initiated. The process continues to a step 604 where a customer service database is accessed. The customer service database accessed may be one or more database 136 and/or customer service database 220, either alone or in combination. Once the connection to the customer service database 220 is established, the process continues to a step 606 where account records for a customer identification, name, and/or phone number(s) is queried from the customer service database 220. The process then continues to a step 608 where the results of the query are optionally saved to a Fetchit data storage, such as data storage 115. The process then concludes at step 610.

Figure 7:
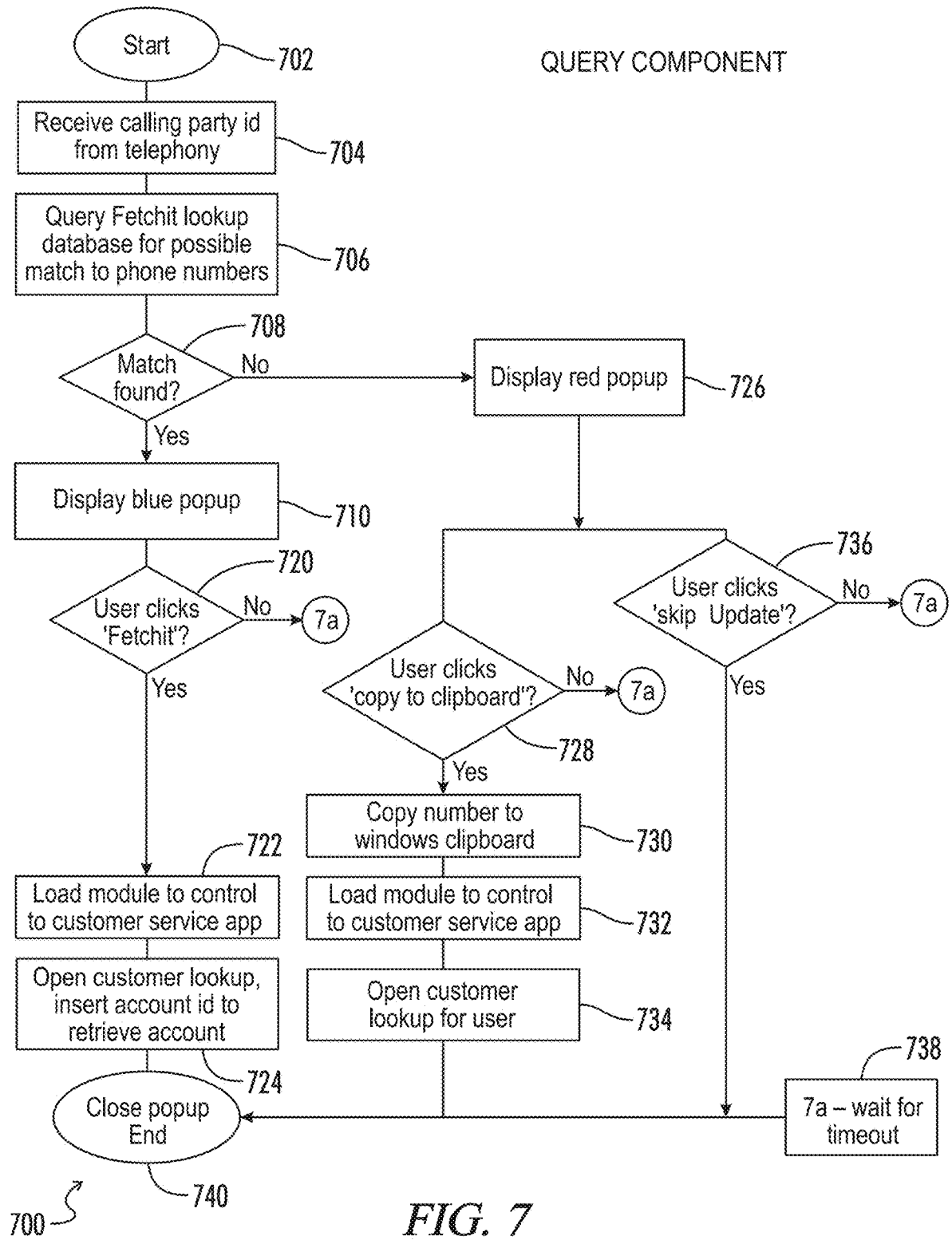
FIG. 7 illustrates an exemplary embodiment of a process for querying calling party information according to aspects of the present disclosure.

FIG. 7 illustrates an exemplary embodiment of a process for querying calling party information according to aspects of the present disclosure. Retrieval of a customer name and identification information (such as phone number) may be performed by a retrieval component (e.g., Retrieval component 114) as a service apparatus running the background of a host system executed by the application system 110. The component may be configured to execute at a periodic or non-periodic time interval, such as every 60 minutes in an exemplary embodiment. The component has the task of utilizing the module which interfaces to a customer agent's customer service application to query the customer service database for all customer identification include, names, phone numbers, etc. and to save them into the application system 110's data storage 115. These records may be used by a query component (e.g., Query component 116) upon receiving incoming calls. The query component may include methods and apparatuses for various functionality of the present disclosure. The process illustrated by FIG. 7 begins with the triggering of an incoming call via a telephony interface module. A telephony provider sends a calling party ID (CPID) between the first and second ring upon initiating a call to the customer service agent's location. The application system 110 may capture the CPID and execute a query to the data storage 115 of the application system 110, for example using the query component 116.

The process 700 begins at a step 702. At a step 704 a calling party identifier such as a telephone number or other identifier is received from a telephony system (e.g., telephony PBX system 140 and/or network 150), for example at the application system 110. The process continues to a step 706 where a look-up database such as the data store 115 is queried for possible match(es) corresponding to the calling party identifier. It is determined at a step 708 whether a match is found between the calling party identifier or information associated therewith and the information contained in the look-up database. If a match is found, the process continues to a step 710 where a blue pop-up is displayed to a user/agent of the customer service application 130, 210 to indicate known information. The process continues to a step 720 where it is determined whether the user/agent selects or clicks a retrieval option (e.g., a "Fetchit" operation to retrieve information). If the user selects the retrieval option, the process continues to a step 722 where module to control customer service application 130, 210. The process then continues to a step 724 where a customer look-up is opened, and an account identifier is inserted to retrieve account information. The process then concludes at a step 740.

If it is determined at step 708 that no match is found, the process continues to a step 726 where a red pop-up is presented to a user/agent. The process continues to step 728 where it is determined whether a user/agent selects a copy to clipboard selector and step 736 where it is determined whether a user/agent selects a skip update selector. In the cases of both step 728 and 736, if the determined result is negative, the process continues to step 738 to wait for a timeout. If the result of step 728 is positive, the process continues to a step 730 where a caller number is selectively copied to a clipboard (e.g., an operating system or application-based clipboard for later use). The process then continues to a step 732 where a module is loaded to control to customer service application 130, 210. The process next continues to a step 734 where a customer look-up is opened for an identified user. The process then concludes at step 740. If the result of the determination at step 736 is positive, the process optionally continues to at least one of a step 740 where the pop-up is closed and the process is ended, and/or step 738 where the system waits for a timeout.

In an exemplary embodiment, the process begins with the triggering of an incoming call via the selected telephony interface module. A telephony provider sends a CPID (calling party ID) between the 1st and 2nd ring upon initiating a call to the customer service agent's location. The interface module may capture this CPID and execute a query to an SQL data storage database.

In operation, if there is a match found between the CPID and a phone number that exists in the data storage 115, the customer service application 130, 210 may display a blue pop-up notification, for example as illustrated in FIG. 3. This pop-up notification may include the name of the customer as recorded in the customer service application 130, 210 along with the CPID information received from the telephony interface module. The user/agent may be presented with a Fetchit button which, if pressed, will initiate the control of the customer service application 130, 210. The module designated for the customer service application is loaded and then the application system 110 may begin controlling the customer service application 130, 210 to direct it to open the customer lookup selection, initiate the input of the matching account ID, and execute the lookup. This functionality is capable of providing error-free functionality to quickly retrieve the proper customer account record without questioning the customer for information such as name, phone number, etc. If the button is clicked, the system may automatically close the popup after the duration specified in configuration component expires.

If a match is not found, the system may display a red pop-up notification as illustrated by FIG. 3. This pop-up notification may designate to the user/agent that this is an Unknown Caller along with the CPID information received from the telephony interface module. The user/agent may then be presented with two possible buttons, Copy Phone Number and Skip Update. Copy Phone Number may be used to "copy" the CPID to the system clipboard in order to provide an error-free capability to optionally "paste" this number into the customer's record, if desired, as a new or updated contact number. Then the module designated for the customer service application 130, 210 may be loaded and then the application system 110 may begin controlling the customer service application 130, 210 to direct it to open the customer lookup selection and close. This saves the user/agent a step to manually look up the customer calling by name, phone number, etc. Skip Update may be configured to simply close the pop-up notification. If neither button is clicked, the system may automatically close the pop-up after the duration specified in configuration component expires.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for providing a modular communication middleware for data retrieval and presentation, comprising:
an agent device, the agent device including a customer service application and a customer service database, the customer service database configured to store customer information;
an external telephony system; and an application system including:
a data storage;
a query component coupleable to the external telephony system, the query component configured to receive an incoming call from the external telephony system and to query the data storage for additional information based at least in part upon the received incoming call; and
a user interface component configured to selectively transmit match information to the customer service application for presentation to a user of the customer service application based at least in part upon a result of the query to the data storage,
wherein the application system is configured to determine an interface module associated with the customer service application, to query the customer service database using the interface module, to receive at least a portion of customer information, and to store the at least a portion of customer information at the data storage.

2. The system of claim 1, wherein the agent device includes a display unit, the display unit configured to provide a visual indicia of the transmitted match information received from the application system.

3. The system of claim 1, wherein the transmitted match information is a successful match indication, and wherein the application system is configured to provide at least a portion of the additional information from the data storage to the agent device.

4. The system of claim 1, wherein the transmitted match information is an unsuccessful match indication.

5. The system of claim 1, wherein the application system is configured to query the customer service database at a predetermined time interval.

6. The system of claim 1, wherein the at least a portion of customer information stored at the data storage is configured to be queried as part of future queries to the data storage for additional information.

7. The system of claim 1, wherein the incoming call includes calling party identification (CPID) information, and wherein the query component is configured to query the data storage based upon the CPID information of the incoming call.

8. The system of claim 7, wherein the application system is configured to convey an indication of a match between the CPID information of the incoming call and a record stored in the data storage of the application system.

9. The system of claim 7, wherein the application system is configured to convey an indication of no match between the CPID information of the incoming call and a record stored in the data storage of the application system.

10. A method for providing data retrieval and presentation, comprising:
receiving an incoming call from an external telephony system at an application system;
querying a data storage of the application system responsive to the received incoming call;
determining a match information responsive to the query to the data storage;
conveying the match information from the application system to a customer service application;
providing a visual indicia to a user of the customer service application corresponding to the match information,
querying a customer service database associated with the customer service application at a predetermined time interval by the application system;
receiving at least a portion of customer information at the application system responsive to the querying the customer service database; and
storing the at least a portion of customer information at the data storage of the application system.

11. The method of claim 10, wherein the incoming call includes calling party identification (CPID) information, the querying the data storage including querying the data storage based upon the CPID information.

12. The method of claim 11, the conveying the match information including conveying an indication of a match between the CPID information of the incoming call and a record stored in the data storage of the application system.

13. The method of claim 11, the conveying the match information including conveying an indication of no match between the CPID information of the incoming call and a record stored in the data storage of the application system.

14. The method of claim 13, further comprising:
wherein the querying the customer service database associated with the customer service application occurs at a predetermined time interval.

15. The method of claim 11, wherein the at least a portion of customer information stored at the data storage is configured to be queried as part of the query to the data storage responsive to the received incoming call.

16. The method of claim 10, further comprising:
the conveying the match information including conveying an indication of no match between the incoming call and a record stored in the data storage of the application system,
receiving an indication from a user of the customer service application to store at least a portion of customer information; and
storing the at least a portion of customer information responsive to the received indication from the user.

17. The method of claim 16, wherein the receiving the indication from the user comprises receiving a copy request from the user, the copy request associated with the at least a portion of customer information, the at least a portion of customer information obtained from the incoming call.

18. An application system coupleable to an external telephony system and a customer service application, including:
a data storage;
a query component coupleable to the external telephony system, the query component configured to receive an incoming call from the external telephony system and to query the data storage for additional information based at least in part upon the received incoming call, the incoming call including calling party identification (CPID) information, the query component configured to query the data storage based upon the CPID information; and
a user interface component configured to selectively transmit match information to the customer service application based at least in part upon a result of the query to the data storage,
wherein the application system is configured to determine an interface module associated with the customer service application, to query the customer service database using the interface module, to receive at least a portion of customer information, and to store the at least a portion of customer information at the data storage.

19. The application system of claim 18, wherein the application system is configured to convey an indication of a match between the CPID information of the incoming call and a record stored in the data storage of the application system.

20. The application system of claim 18, wherein the application system is configured to convey an indication of no match between the CPID information of the incoming call and a record stored in the data storage of the application system.

\* \* \* \* \*

UNITED STATES PATENT AND TRADEMARK OFFICE
CERTIFICATE OF CORRECTION

PATENT NO. : 11,281,685 B1
APPLICATION NO. : 16/351157
DATED : March 22, 2022
INVENTOR(S) : David H. Wright et al.

It is certified that error appears in the above-identified patent and that said Letters Patent is hereby corrected as shown below:

On the Title Page

Item (12), delete "Wright" and insert --Wright et al.--

Item (72), please add the following Inventors:
James Lee Murphy
Eads, Tennessee, United States
Michael Howard Garey
Chelan, Washington, United States Signed and Sealed this
Seventeenth Day of October, 2023

Katherine Kelly Vidal
*Director of the United States Patent and Trademark Office*